US012182905B2

United States Patent
Luo et al.

(10) Patent No.: US 12,182,905 B2
(45) Date of Patent: Dec. 31, 2024

(54) METHOD, PROCESSING DEVICE, AND DISPLAY SYSTEM FOR VIRTUAL INFORMATION DISPLAY BASED ON SPATIAL POSITIONING

(71) Applicant: Industrial Technology Research Institute, Hsinchu (TW)

(72) Inventors: Yi-Wei Luo, Taipei (TW); Jian-Lung Chen, Taoyuan (TW); Ting-Hsun Cheng, Chiayi County (TW); Yu-Ju Chao, Hsinchu County (TW); Yu-Hsin Lin, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 169 days.

(21) Appl. No.: 17/939,900

(22) Filed: Sep. 7, 2022

(65) Prior Publication Data

US 2023/0070721 A1  Mar. 9, 2023

Related U.S. Application Data

(60) Provisional application No. 63/242,044, filed on Sep. 9, 2021.

(30) Foreign Application Priority Data

Jul. 29, 2022 (TW) .................................. 111128679

(51) Int. Cl.
*G06T 11/00* (2006.01)
*G02B 27/01* (2006.01)
(Continued)

(52) U.S. Cl.
CPC .......... *G06T 11/00* (2013.01); *G02B 27/0101* (2013.01); *G02B 27/0179* (2013.01);
(Continued)

(58) Field of Classification Search
None
See application file for complete search history.

(56) References Cited

U.S. PATENT DOCUMENTS

| 6,111,580 A * | 8/2000 | Kazama ................. G06F 3/017 715/863 |
| 9,967,475 B2 | 5/2018 | Schneider et al. |

(Continued)

FOREIGN PATENT DOCUMENTS

| CN | 103500061 | 11/2017 |
| TW | 201621549 | 6/2016 |

(Continued)

OTHER PUBLICATIONS

"Office Action of Taiwan Counterpart Application", issued on May 29, 2023, p. 1-p. 12.

*Primary Examiner* — Anh-Tuan V Nguyen
(74) *Attorney, Agent, or Firm* — JCIPRNET

(57) ABSTRACT

A method, a processing device, and a system for information display are provided, and the system includes a light transmissive display. A first information extraction device extracts spatial position information of a user, and a second information extraction device extracts spatial position information of a target object. The processing device performs the following steps. Display position information of virtual information of the target object on the display is determined according to the spatial position information of the user and the spatial position information of the target object. The display position information includes a first display reference position corresponding to a previous time and a second display reference position corresponding to a current time. An actual display position of the virtual information on the display corresponding to the current time is determined according to a distance between the first display reference (Continued)

position and the second display reference position. The virtual information is displayed on the display according to the actual display position.

20 Claims, 12 Drawing Sheets

(51) Int. Cl.
    *G06F 3/01*     (2006.01)
    *G06T 7/73*     (2017.01)
    *G06V 20/20*     (2022.01)
    *G06V 40/16*     (2022.01)

(52) U.S. Cl.
    CPC ............... *G06F 3/012* (2013.01); *G06T 7/73* (2017.01); *G06V 20/20* (2022.01); *G06V 40/166* (2022.01); *G02B 2027/0138* (2013.01); *G02B 2027/0187* (2013.01); *G06T 2210/12* (2013.01); *G06V 2201/07* (2022.01)

(56) References Cited

U.S. PATENT DOCUMENTS

| | | | |
|---|---|---|---|
| 2011/0043616 A1* | 2/2011 | Dobbie | G02B 27/017 |
| | | | 348/333.08 |
| 2013/0232515 A1* | 9/2013 | Rivera | G06Q 30/02 |
| | | | 725/12 |
| 2014/0002460 A1* | 1/2014 | Riedel | H04N 21/4882 |
| | | | 345/428 |
| 2014/0232630 A1 | 8/2014 | Plaehn | |
| 2016/0314609 A1* | 10/2016 | Taylor | A63F 13/65 |
| 2019/0058860 A1* | 2/2019 | Wang | G06T 7/70 |
| 2019/0172262 A1* | 6/2019 | McHugh | G06F 3/011 |
| 2020/0333940 A1 | 10/2020 | Lee et al. | |
| 2021/0084259 A1* | 3/2021 | Kies | G06F 1/1686 |
| 2021/0390745 A1* | 12/2021 | Rykhliuk | G06V 10/462 |
| 2022/0197669 A1* | 6/2022 | Xu | G06F 9/452 |
| 2022/0276696 A1* | 9/2022 | Brown | G06F 3/1423 |

FOREIGN PATENT DOCUMENTS

| | | |
|---|---|---|
| TW | 201913298 | 4/2019 |
| TW | 202017368 | 5/2020 |

* cited by examiner

METHOD, PROCESSING DEVICE, AND DISPLAY SYSTEM FOR VIRTUAL INFORMATION DISPLAY BASED ON SPATIAL POSITIONING

CROSS-REFERENCE TO RELATED APPLICATION

This application claims the priority benefit of U.S. provisional application Ser. No. 63/242,044, filed on Sep. 9, 2021, and Taiwan application Serial No. 111128679, filed on Jul. 29, 2022. The entirety of each of the above-mentioned patent application is hereby incorporated by reference herein and made a part of this specification.

BACKGROUND

Technical Field

The disclosure relates to an information display technology.

Description of Related Art

With the development of image processing technology and spatial positioning technology, the application of transparent displays has gradually drawn attentions. This type of technology allows a display to be matched with physical objects, and supplemented with virtual related information to produce interactive experiences according to user's needs, so that information may be presented in a more intuitive way.

In addition, the virtual information related to the physical object may be displayed at a specific position of the transparent display, so that the user may simultaneously view the physical object and the virtual information superimposed on the physical object or on one side of the physical object through the transparent display. However, when the physical object moves dynamically, a phenomenon in which the virtual information deviates from the physical object may occur, resulting in a fact that the virtual information displayed on the transparent display cannot follow the movement of the physical object in real time. In addition, since the movement of the physical object may not be predictable or may be variable, the virtual information displayed based on real-time object recognition may be shaken or stacked, making it difficult and uncomfortable for viewers to read the virtual information.

SUMMARY

The disclosure is related to an information display method, a processing device thereof and an information display system.

In an exemplary embodiment of the disclosure, the information display system includes a light transmissive display, a first information extraction device, a second information extraction device and a processing device, where the processing device is connected to the display, the first information extraction device, and the second information extraction device. The first information extraction device is configured to extract spatial position information of a user, and the second information extraction device is configured to extract spatial position information of a target object. The processing device is configured to: determine display position information of virtual information of the target object on the display according to the spatial position information of the user and the spatial position information of the target object, wherein the display position information includes a first display reference position corresponding to a previous time and a second display reference position corresponding to a current time; determine an actual display position of the virtual information on the display corresponding to the current time according to a distance between the first display reference position and the second display reference position; and display the virtual information on the display according to the actual display position.

In an exemplary embodiment of the disclosure, the information display method is adapted for an information display system including a light transmissive display, a first information extraction device, a second information extraction device and a processing device, and includes following steps: using the first information extraction device to extract spatial position information of a user; using the second information extraction device to extract spatial position information of a target object; determining display position information of virtual information of the target object on the display according to the spatial position information of the user and the spatial position information of the target object, wherein the display position information includes a first display reference position corresponding to a previous time and a second display reference position corresponding to a current time; determining an actual display position of the virtual information on the display corresponding to the current time according to a distance between the first display reference position and the second display reference position; and displaying the virtual information on the display according to the actual display position.

In an exemplary embodiment of the disclosure, the processing device is connected to a light transmissive display, a first information extraction device, and a second information extraction device. The first information extraction device is configured to extract spatial position information of a user, and the second information extraction device is configured to extract spatial position information of a target object. The processing device includes a memory and a processor connected to the memory. The memory is configured to store data, and the processor is configured to execute following steps: using the first information extraction device to extract spatial position information of the user; using the second information extraction device to extract spatial position information of the target object; determining display position information of virtual information of the target object on the display according to the spatial position information of the user and the spatial position information of the target object, wherein the display position information includes a first display reference position corresponding to a previous time and a second display reference position corresponding to a current time; determining an actual display position of the virtual information on the display corresponding to the current time according to a distance between the first display reference position and the second display reference position; and displaying the virtual information on the display according to the actual display position.

To make the aforementioned more comprehensible, several embodiments accompanied with drawings are described as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Some exemplary embodiments of the disclosure will be described below with reference to the accompanying drawings. Element symbols cited in the following description, when the same element symbols appear in different drawings, will be regarded as the same or similar elements. These exemplary embodiments are only a part of the disclosure, and do not disclose all possible implementations of the disclosure. Rather, these exemplary embodiments are merely examples of methods, devices, and systems within the scope of the disclosure.

Figure 1A:
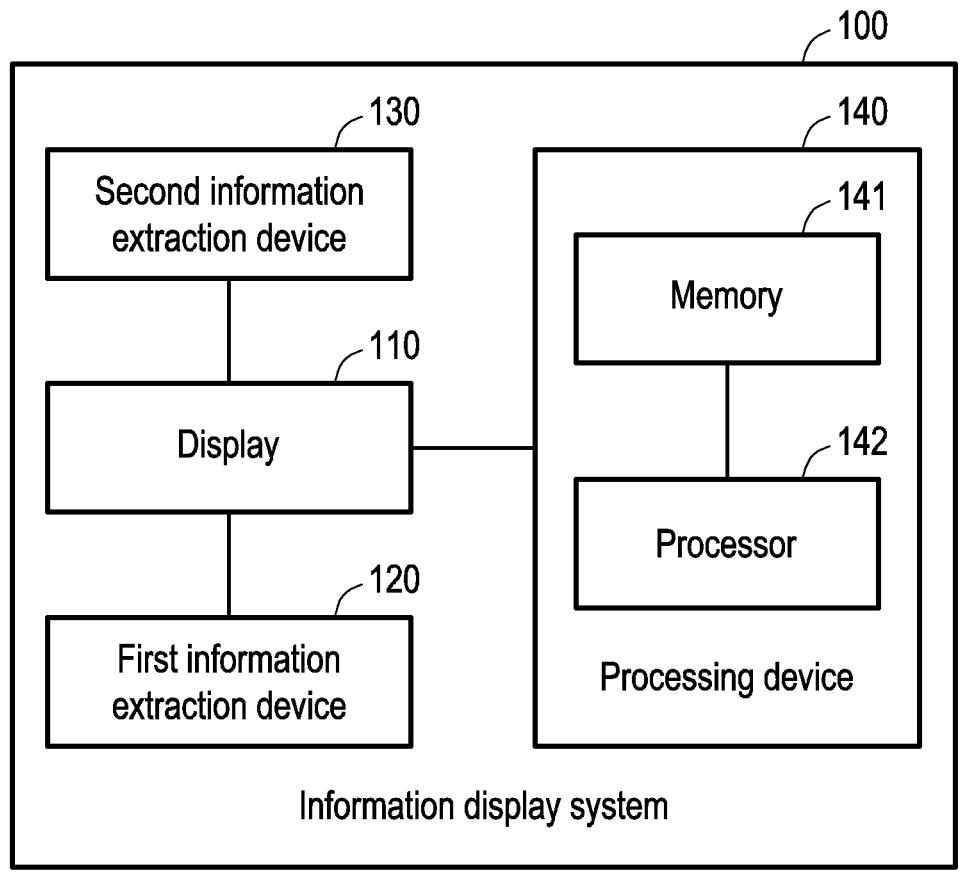
FIG. 1A is a block diagram of an information display system according to an exemplary embodiment of the disclosure.

FIG. 1A is a block diagram of an information display system according to an exemplary embodiment of the disclosure. First, in FIG. 1A, each component and configuration relationship thereof in the system are introduced, and functions will be disclosed together with flowcharts of the subsequent exemplary embodiments.

Referring to FIG. 1A, an information display system 100 in the exemplary embodiment may include a display 110, a first information extraction device 120, a second information extraction device 130, and a processing device 140, where the processing device 140 may be electrically connected to the display 110, the first information extraction device 120 and the second information extraction device 130 in a wireless or wired manner.

The display 110 may be used to display information, and the display 110 is, for example, a light transmissive display such as a liquid crystal display (LCD), a field sequential color liquid crystal display, a light emitting diode (LED) display, an electrowetting display, etc., or a projection-type light transmissive display.

The first information extraction device 120 is configured to extract spatial position information of a user, and the second information extraction device 130 is configured to extract spatial position information of a target object in a physical scene. The first information extraction device 120 may be, for example, at least one image sensor or at least one image sensor combined with at least one depth sensor to perform image recognition and positioning on the user, where the image sensor may include a visible light sensor or a non-visible light sensor such as an infrared sensor, etc. In addition, the first information extraction device 120 may also be, for example, an optical positioning device adapted to perform optical spatial positioning on the user. As long as it is a device or a combination thereof capable of positioning position information of the user, it belongs to a scope of the first information extraction device 120.

The second information extraction device 120 may be, for example, at least one image sensor or at least one image sensor combined with at least one depth sensor to perform image recognition and positioning on the target object, where the image sensor may include a visible light sensor or a non-visible light sensor such as an infrared sensor, etc. As long as it is a device or a combination thereof capable of positioning position information of the target object, it belongs to a scope of the second information extraction device 130.

In the embodiment of the disclosure, the above-mentioned image sensor may be used for capturing images and includes a camera lens having a lens and a photosensitive element. The above-mentioned depth sensor may be used to detect depth information, which may be implemented by using an active depth sensing technology and a passive depth sensing technology. The active depth sensing technology may calculate depth information by actively emitting a light source, an infrared ray, an ultrasonic wave, a laser, etc., to serve as signals in collaboration with a time difference ranging technology. The passive depth sensing technology may capture two images in front of two image sensors from different viewing angles, so as to calculate depth information by using a parallax of the two images.

The processing device 140 is used to control operations of the information display system 100, and may include a memory 141 and a processor 142. The memory 141 may be, for example, any type of a fixed or removable random access memory (RAM), a read-only memory (ROM), a flash memory (flash memory), a hard disk or other similar devices, integrated circuits and combinations thereof. The processor 142 may be, for example, a central processing unit (CPU), an application processor (AP), or other programmable general-purpose or special-purpose microprocessors, a digital signal processing (DSP), an image signal processor (ISP), a graphics processing unit (GPU) or other similar devices, integrated circuits and combinations thereof. In the following exemplary embodiments, the information display method executed by the processing device 140 are introduced below with reference of the components of the information display system 100.

In the exemplary embodiment, the processing device 140 may be a computer device built in the display 110 or connected to the display 110. The first information extraction device 120 and the second information extraction device 130 may be respectively disposed on opposite sides of the display 110 in a field to which the information display system 100 belongs, and are used for locating the user and the target object, and transmitting information to the processing device through their respective communication interfaces in a wired or wireless manner. In some embodiments, the first information extraction device 120 and the second information extraction device 130 may also respectively have a processor and a memory, and have a computing capability capable of performing object recognition and object tracking according to image data. In another exemplary embodiment, the information display system 100 may be a single integrated system, which may be implemented as a head-mounted display device, a smart phone, a tablet computer, etc., which is not limited by the disclosure. In the following exemplary embodiments, implementation of the information display method is described below with reference of the components of the information display system 100.

Figure 1B:
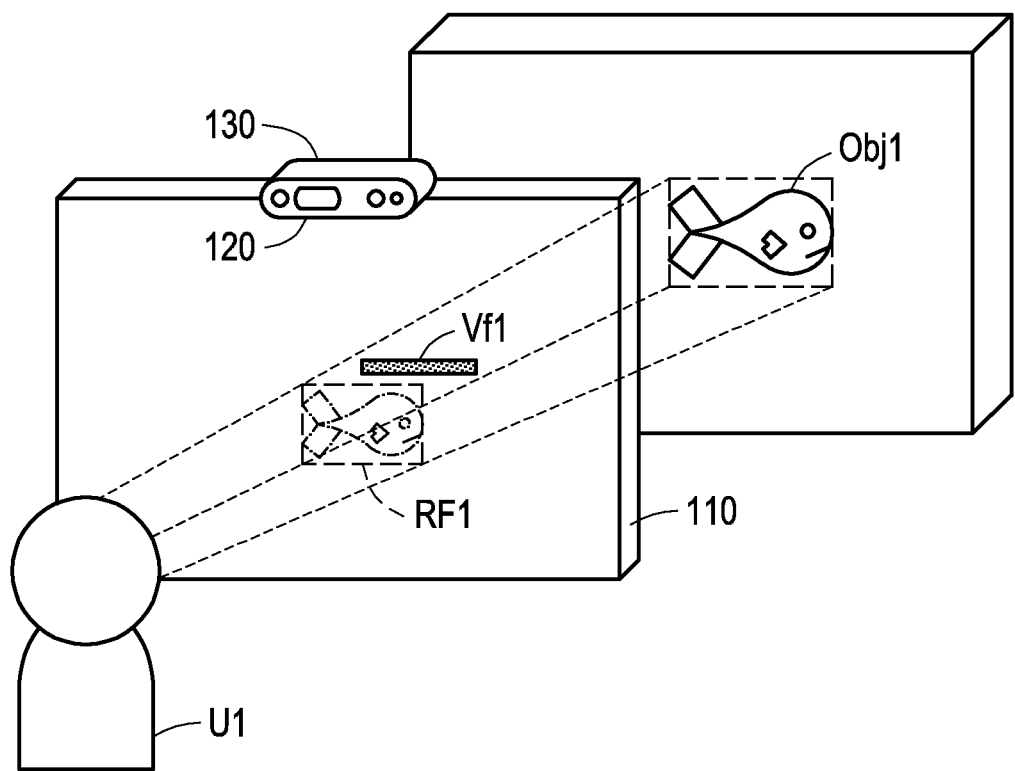
FIG. 1B is a schematic diagram of an information display system according to an exemplary embodiment of the disclosure.

FIG. 1B is a schematic diagram of an information display system according to an exemplary embodiment of the disclosure. Referring to FIG. 1B, a user U1 and a target object Obj1 are respectively located on different sides of the display 110. The user U1 may view a physical scene superimposed with virtual information Vf1 of the target object Obj1 through the display 110. The virtual information Vf1 may be regarded as augmented reality content augmented based on the target object Obj1. In some embodiments, the first information extraction device 120 may include a first image sensor for photographing the user U1, and the second information extraction device 130 may include a second image sensor for photographing the target object Obj1. The first information extraction device 120 may obtain spatial position information of the user U1 based on an extracted user image, and the second information extraction device 130 may obtain spatial position information of the target object Obj1 based on an extracted target object image.

The processing device 140 may determine display position information of the virtual information Vf1 on the display 110 according to the spatial position information of the user U1 and the spatial position information of the target object Obj1. In the example of FIG. 1B, the above-mentioned display position information is implemented as a reference display object box RF1 on a display plane. In other embodiments, the display position information may be implemented as a point on the display plane of the display 110. The display position information may be regarded as a landing point or region where the user's sight is projected on the display plane when viewing the target object Obj1. In this way, the processing device 140 may display the virtual information Vf1 by using the display position information (for example, the reference display object box RF1) as a reference. Based on various requirements or different applications, the processing device 140 may determine an actual display position of the virtual information Vf1 according to the display position information, so that the user U1 may view the virtual information Vf1 located near the target object Obj1, or view the virtual information Vf1 superimposed on the target object Obj1 through the display 110.

It should be noted that, in some embodiments, the user U1 and/or the target object Obj1 may move dynamically. For example, the target object Obj1 may be a fish kept in an aquarium, and the virtual information Vf1 may be a species name or introduction information of the fish. Therefore, the first information extraction device 120 may continuously shoot the user U1 to generate a video sequence including a plurality of user images corresponding to different time points, and the first information extraction device 120 may track the spatial position information of the user U1 according to the video sequence including the plurality of user images. Similarly, the second information extraction device 130 may continuously shoot the target object Obj1 to generate a video sequence including a plurality of target object images corresponding to different time points, and the second information extraction device 130 may track the spatial position information of the target object Obj1 according to the video sequence including the plurality of target object images. Since the processing device 140 may continuously update the display position information of the virtual information Vf1 based on tracking results of the target object Obj1 and the user U1, the virtual information Vf1 displayed on the display 110 may be correspondingly moved in response to movement of the user U1 and/or movement of the target object Obj1, so as to achieve a visual effect that the virtual information Vf1 follows the target object Obj1.

Figure 2:
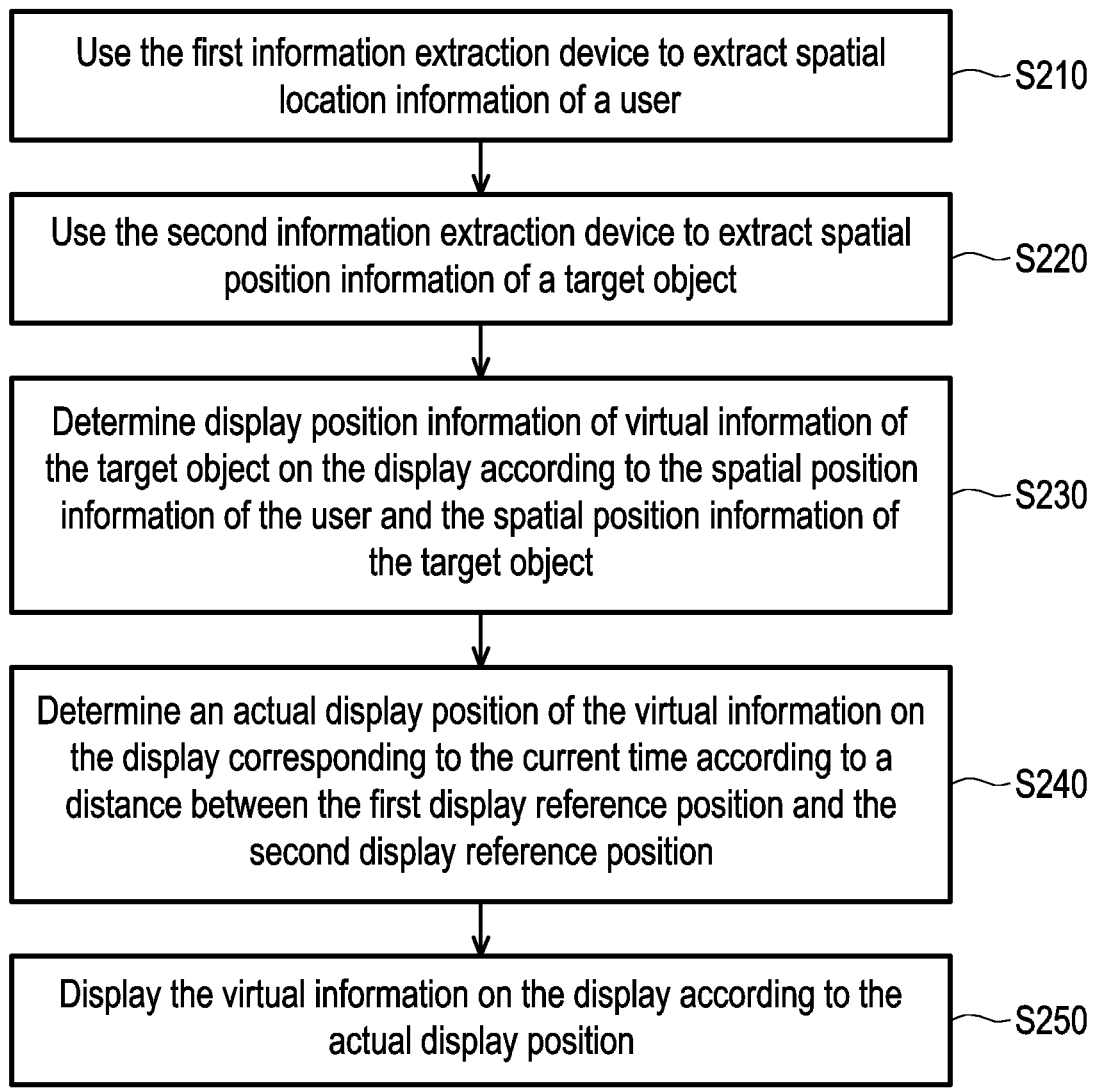
FIG. 2 is a flowchart of an information display method according to an exemplary embodiment of the disclosure.

FIG. 2 is a flowchart of an information display method according to an exemplary embodiment of the disclosure. Referring to FIG. 1A, FIG. 1B and FIG. 2 at the same time, a method flow of FIG. 2 may be implemented by the information display system 100 of FIG. 1A and FIG. 1B. Here, the user U1 may view the target object Obj1 and the virtual information Vf1 thereof through the display 110 of the information display system 100.

In step S210, in the information display system 100, the first information extraction device 120 is used to extract the spatial position information of the user U1. In step S220, in the information display system 100, the second information extraction device 130 is used to extract the spatial position information of the target object Obj1. As mentioned above, the first information extraction device 120 and the second information extraction device 130 are, for example, image sensors, depth sensors, or a combination thereof that may locate positions of the user U1 and the target object Obj1.

In step S230, the processing device 140 of the information display system 100 determines the display position information of the virtual information Vf1 of the target object Obj1 on the display 110 according to the spatial position information of the user U1 and the spatial position information of the target object Obj1. The display position information includes a first display reference position corresponding to a previous time and a second display reference position corresponding to a current time. The processing device 140 may continuously calculate a plurality of display reference positions respectively corresponding to a plurality of continuous times according to the spatial position information of the user U1 and the spatial position information of the target object Obj1. In other words, the first information extraction device 120 and the second information extraction device 130 may continuously update the spatial position information of the target object Obj1 and the user U1, and the processing device 140 may continuously update the display position information of the virtual information Vf1 accordingly.

In step S240, the processing device 140 of the information display system 100 determines an actual display position of the virtual information Vf1 on the display 110 corresponding to the current time according to a distance between the first display reference position and the second display reference position. Then, in step S250, the processing device 140 of the information display system 100 displays the virtual information Vf1 on the display 110 according to the actual display position.

Namely, in the process that the processing device 140 determines the actual display position of the virtual information Vf1 corresponding to the current time, the processing device 140 may calculate the distance between the first display reference position at the previous time and the second display reference position at the current time. Then, the processing device 140 determines to update the actual display position of the virtual information Vf1 on the display 110 by using the second display reference position of the current time according to the above distance, or determines not to update the actual display position of the virtual information Vf1.

Figure 3:
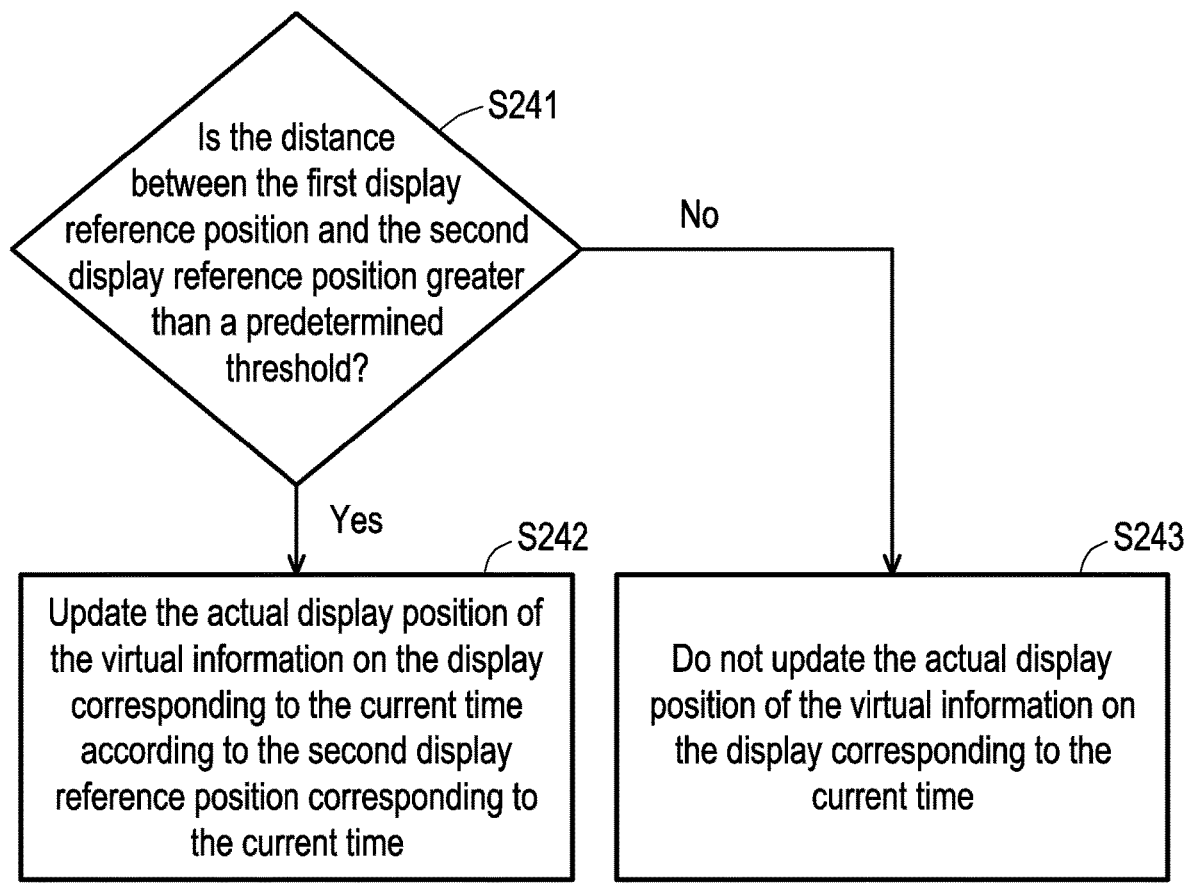
FIG. 3 is a flowchart of determining an actual display position corresponding to a current time according to an exemplary embodiment of the disclosure.

FIG. 3 is a flowchart of determining an actual display position corresponding to the current time according to an exemplary embodiment of the disclosure. Referring to FIG. 3, step S240 in FIG. 2 may be implemented as steps S241 to S243. In step S241, the processing device 140 determines whether the distance between the first display reference position corresponding to the previous time and the second display reference position corresponding to the current time is greater than a predetermined threshold.

If the distance between the first display reference position and the second display reference position is greater than the predetermined threshold, it means that a displacement of the target object Obj1 observed by the user U1 is obvious. Therefore, in response to the fact that the distance between the first display reference position and the second display reference position is greater than the predetermined threshold (YES in step S241), in step S242, the processing device 140 updates the actual display position of the virtual information Vf1 on the display 110 corresponding to the current time according to the second display reference position corresponding to the current time.

On the other hand, if the distance between the first display reference position and the second display reference position is not greater than the predetermined threshold, it means that the displacement of the target object Obj1 observed by the user U1 is small. Therefore, in response to the fact that the distance between the first display reference position and the second display reference position is not greater than the predetermined threshold (No in step S241), in step S243, the processing device 140 does not update the actual display position of the virtual information Vf1 on the display 110 corresponding to the current time, i.e., the actual display position corresponding to the current time may be the same as the actual display position corresponding to the previous time. In an embodiment, the virtual information Vf1 may be displayed according to the actual display position determined based on the first display reference position at the previous time. Namely, if the distance between the first display reference position and the second display reference position is not greater than the predetermined threshold, the display position of the virtual information Vf1 on the display 110 may not be changed. In this way, the actual display position of the virtual information Vf1 will not be changed due to slight shaking or movement of the target object Obj1, which greatly improves comfort of the user U1 in viewing the virtual information Vf1. Namely, the virtual information Vf1 may be stably displayed on the display 110, and occurrence of shaking or afterimage stacking may be reduced.

For convenience and clarity's sake, embodiments are provided with reference of the information display system 100 to illustrate implementations of the disclosure for calculating the display position information.

Figure 4:
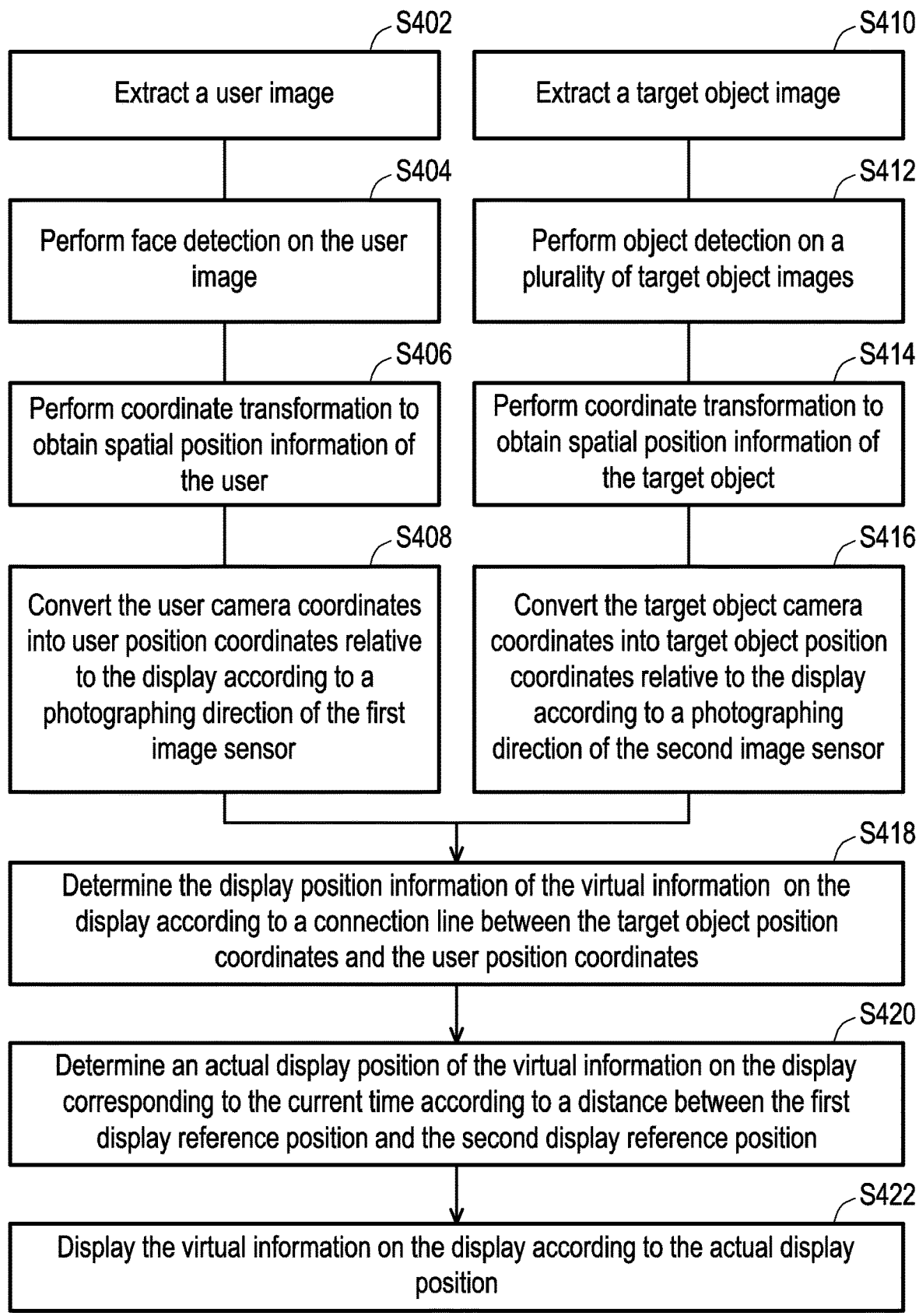
FIG. 4 is a flowchart of an information display method according to an exemplary embodiment of the disclosure.

FIG. 4 is a flowchart of an information display method according to an exemplary embodiment of the disclosure. Referring to FIG. 4, in step S402, the first information extraction device 120 extracts a user image, where the number of users may be more than one. In step S404, the first information extraction device 120 performs face detection on a plurality of user images to obtain a face position in each of the user images. The first information extraction device 120 may detect a face block and facial features in the face block from each user image through various face detection technologies and face feature detection technologies. The face detection technology is, for example, a traditional face detection algorithm using pixel value analysis or a deep learning algorithm using machine learning, etc., which is not limited in the disclosure. The above-mentioned facial features are, for example, eyes. In some embodiments, the first information extraction device 120 may use a center point of the face block as the face position or use a center point of the eyes as the face position, but the disclosure is not limited thereto.

In step S406, the first information extraction device 120 performs coordinate transformation according to the face position to obtain the spatial position information of the user U1. The face position obtained based on the user image is two-dimensional pixel coordinates. The first information extraction device 120 may perform coordinate transformation according to the depth information of the user U1 and the face position in the user image, so as to generate the spatial position information of the user U1. In the embodiment of FIG. 4, the spatial position information of the user U1 may include user camera coordinates in a camera coordinate system.

Figure 5A:
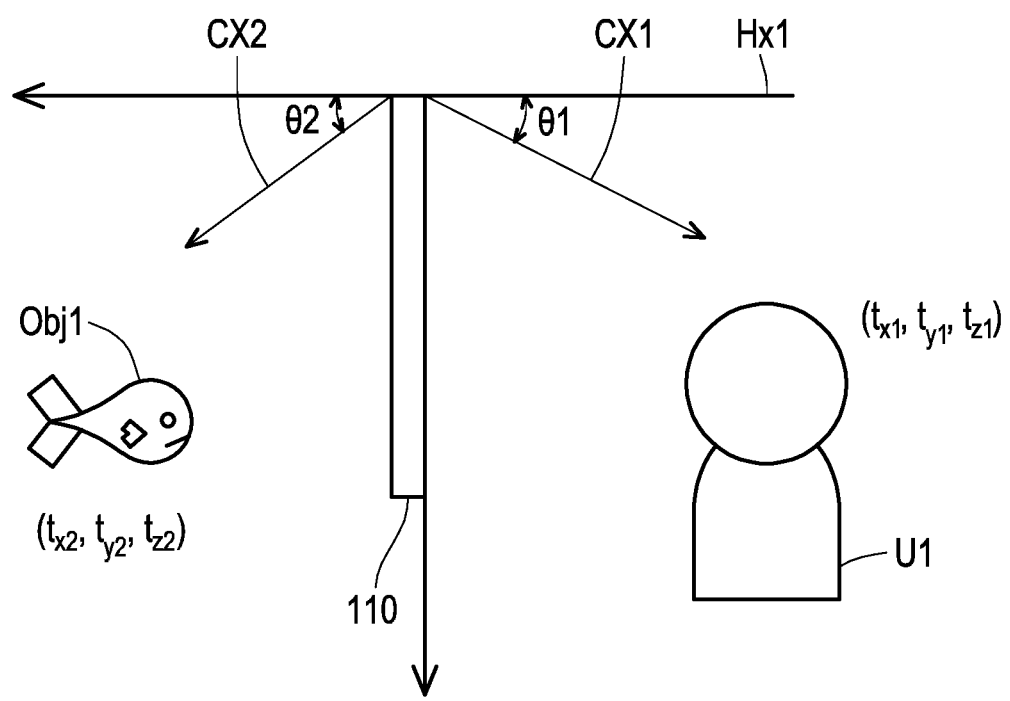
FIG. 5A is a schematic diagram illustrating photographing directions of a first image sensor and a second image sensor according to an exemplary embodiment of the disclosure.

Then, in step S408, the processing device 140 converts the user camera coordinates into user position coordinates relative to the display 110 according to a photographing direction of the first image sensor of the first information extraction device 120. In an embodiment, the photographing direction of the first image sensor may include a photographing pitch angle in a vertical direction. For example, FIG. 5A is a schematic diagram illustrating the photographing directions of the first image sensor and the second image sensor according to an exemplary embodiment of the disclosure. Referring to FIG. 5A, the first image sensor for photographing the user U1 has a photographing pitch angle $\theta 1$. The photographing pitch angle $\theta 1$ is an included angle between a lens optical axis CX1 of the first image sensor and a display plane normal line HX1 of the display 110. In one embodiment, it is assumed that the user camera coordinates are $(cx_1, cy_1, cz_1)$, the processing device 140 may convert the user camera coordinates $(cx_1, cy_1, cz_1)$ into user position coordinates $(t_{x1}, t_{y1}, t_{z1})$ relative to the display 110 according to following equations (1).

$$\begin{cases} t_{x1} = \dfrac{\text{screen width}}{2} + cx_1 \\ t_{y1} = cy_1 \cos\theta_1 + cz_1 \sin\theta_1 \\ t_{z1} = cz_1 \sin\theta_1 - cy_1 \cos\theta_1 \end{cases} \quad \text{Equation (1)}$$

In an embodiment, three coordinate axes of a reference coordinate system to which the user position coordinates $(t_{x1}, t_{y1}, t_{z1})$ relative to the display 110 belong are respectively a display X axis, a display Y axis and a display plane normal line of the display 110. The photographing pitch angle $\theta 1$ is the included angle between the display plane normal line of the display 110 and the lens optical axis CX1 of the first image sensor.

On the other hand, in step S410, the second information extraction device 130 extracts a target object image, where the number of the target objects may be more than one. In step S412, the second information extraction device 130 performs object detection on a plurality of target object images to obtain an object boundary box of the target object in each target object image. The second information extraction device 130 may use a convolutional neural network (CNN) model in the deep learning algorithm to perform object detection. The above-mentioned CNN model is, for example, R-CNN, Fast R-CNN, Faster R-CNN, YOLO or SSD, etc., used for object detection, but the disclosure is not limited thereto. The object detection model used by the second information extraction device 130 may output a position and size of the object boundary box of the target object Obj1 and a classification result of the target object Obj1. In an embodiment, the processing device 140 may select the corresponding virtual information Vf1 from a database to display according to the classification result of the target object Obj1.

In step S414, the second information extraction device 130 performs coordinate transformation according to the object boundary box to acquire the spatial position information of the target object Obj1. A position of the object boundary box obtained based on the target object image belongs to two-dimensional pixel coordinates, and a reference point of the object boundary box may be a vertex position, a center point position or a box boundary of the object boundary box, which is not limited by the disclosure. The second information extraction device 130 may perform coordinate transformation according to the depth information of the target object Obj1 and the object boundary box in the target object image, so as to generate the spatial position information of the target object Obj1. In the embodiment shown in FIG. 4, the spatial position information of the target object Obj1 includes target object camera coordinates in the camera coordinate system.

Then, in step S416, the processing device 140 converts the target object camera coordinates into target object position coordinates relative to the display 110 according to a photographing direction of the second image sensor. In an embodiment, the photographing direction of the second image sensor may include a photographing pitch angle in the vertical direction. For example, referring to FIG. 5A again, the second image sensor for photographing the target object Obj1 has a photographing pitch angle θ2. The photographing pitch angle θ2 is an included angle between a lens optical axis CX2 of the second image sensor and the display plane normal line HX1. It is assumed that the target object camera coordinates are $(cx_2, cy_2, cz_2)$, the processing device 140 may convert the target object camera coordinates are $(cx_2, cy_2, cz_2)$ into target object position coordinates $(t_{x2}, t_{y2}, t_{z2})$ relative to the display 110 according to following equations (2).

$$\begin{cases} t_{x2} = \dfrac{\text{screen width}}{2} + cx_2 \\ t_{y2} = cy_2 \cos\theta_1 + cz_2 \sin\theta_1 \\ t_{z2} = cz_2 \sin\theta_1 - cy_2 \cos\theta_1 \end{cases} \quad \text{Equation (2)}$$

In an embodiment, the reference coordinate system to which the target object position coordinates $(t_{x2}, t_{y2}, t_{z2})$ relative to the display 110 belong is the same as the reference coordinate system to which the user position coordinates $(t_{x1}, t_{y1}, t_{z1})$ belong. The photographing pitch angle θ2 is the included angle between the display plane normal line of the display 110 and the lens optical axis CX2 of the second image sensor.

In some embodiments, the shooting directions of the first image sensor and the second image sensor may be acquired through inertial sensors disposed on the first image sensor and the second image sensor. Taking the embodiment of FIG. 5A as an example, sensing values of the inertial sensors may be used to calculate the photographing pitch angles θ1 and θ2 in FIG. 5A. For example, the above-mentioned inertial sensor is, for example, an acceleration sensor, etc.

Figure 5B:
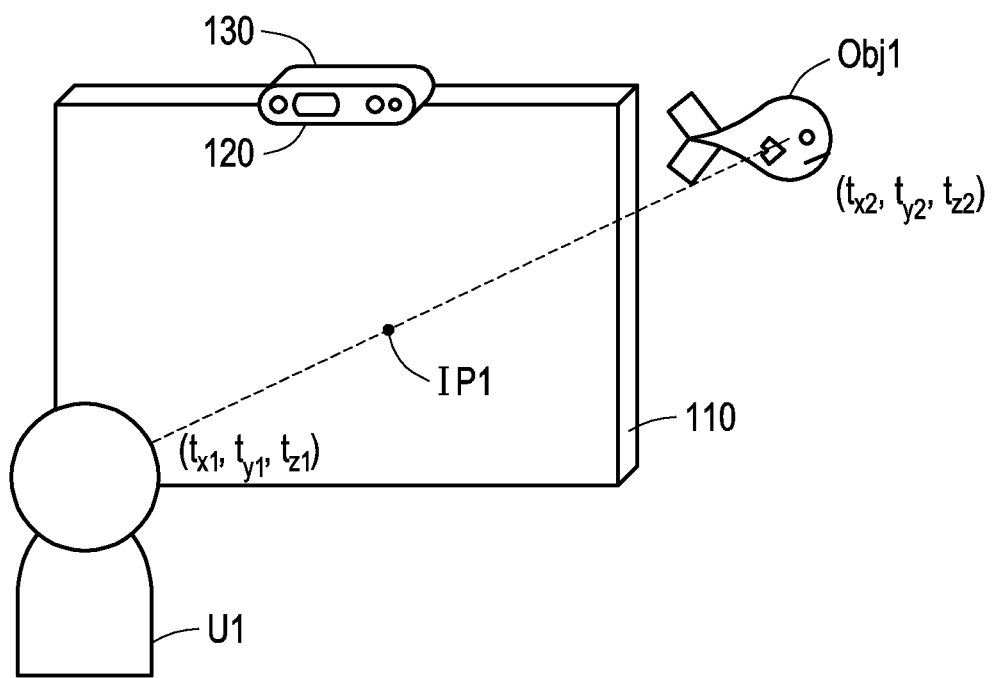
FIG. 5B is a schematic diagram of determining display position information according to an exemplary embodiment of the disclosure.

In step S418, the processing device 140 determines the display position information of the virtual information Vf1 on the display 110 according to a connection line between the target object position coordinates and the user position coordinates. FIG. 5B is a schematic diagram of determining display position information according to an exemplary embodiment of the disclosure. Referring to FIG. 5B, the display position information may include an intersection position IP1 at which the connection line between the target object position coordinates $(t_{x2}, t_{y2}, t_{z2})$ and the user position coordinates $(t_{x1}, t_{y1}, t_{z1})$ intersects the display plane of the display 110. Spatial coordinates (X, Y, Z) of the intersection position IP1 of the user position coordinates $(t_{x1}, t_{y1}, t_{z1})$ and the target object position coordinates $(t_{x2}, t_{y2}, t_{z2})$ calculated according to the equation (1) and the equation (2) on the display plane (i.e., Z=0) may be calculated according to following equations (3):

$$\begin{cases} X = t_{x1} - t_{z1} \times \dfrac{t_{x2} - t_{x1}}{t_{z2} - t_{z1}} \\ Y = t_{x1} - t_{z1} \times \dfrac{t_{y2} - t_{y1}}{t_{z2} - t_{z1}} \\ Z = 0 \end{cases} \quad \text{equation (3)}$$

Then, the processing device 140 may acquire the display position information according to a size and a resolution of the display 110, and the display position information is the pixel coordinates of the display 110. The processing device 140 may convert the spatial coordinates of the intersection position IP1 into the pixel coordinates on the display 110 according to the size and resolution of the display 110 to obtain the display position information of the virtual information Vf1 on the display 110, i.e., the intersection position IP1 represented by pixel coordinates.

As described above, the display position information includes a first display reference position corresponding to the previous time and a second display reference position corresponding to the current time. In step S420, the processing device 140 determines an actual display position of the virtual information Vf1 on the display 110 corresponding to the current time according to a distance between the first display reference position and the second display reference position. In step S422, the processing device 140 displays the virtual information Vf1 on the display 110 according to the actual display position.

Figure 6A:
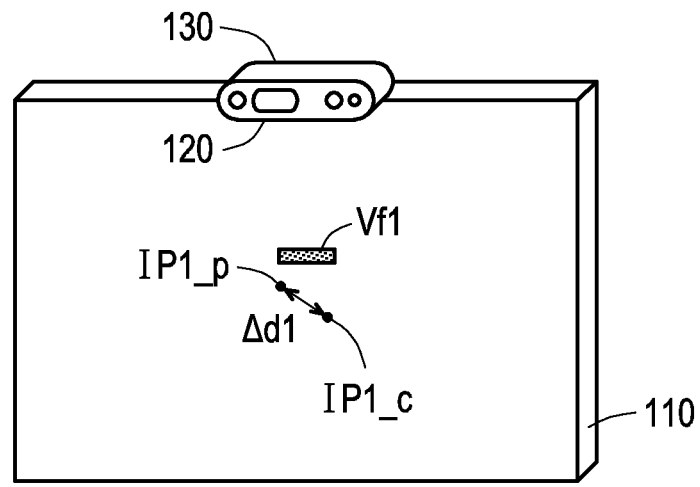
FIG. 6A is a schematic diagram of not updating an actual display position according to an exemplary embodiment of the disclosure.
Figure 6B:
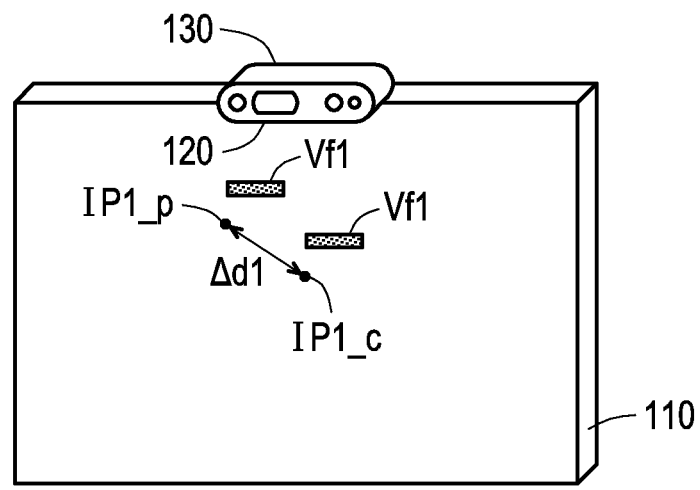
FIG. 6B is a schematic diagram of updating the actual display position according to an exemplary embodiment of the disclosure.

FIG. 6A is a schematic diagram of not updating the actual display position according to an exemplary embodiment of the disclosure. FIG. 6B is a schematic diagram of updating the actual display position according to an exemplary embodiment of the disclosure. Referring to FIG. 6A and FIG. 6B, in the embodiment, the display position information includes a first display reference position IP1_p corresponding to the previous time and a second display reference position IP1_c corresponding to the current time. The first display reference position IP1_p and the second display reference position IP1_c may be the intersection positions determined according to the calculation method in the embodiment of FIG. 4. Based on a previous user image and a previous target object image corresponding to the previous time, the processing device 140 may obtain the first display reference position IP1_p on the display plane according to a connection line between the two spatial coordinates. Then, for example, the processing device 140 may set the actual display position corresponding to the previous time as a position of M pixels above the first display reference position IP1_p, and a value of M may be adjusted according to actual needs, such as referring to a field of view of the user, so that the actual display position falls within a range of the field of view of the user. Afterwards, based on a current user image and a current target object image corresponding to the current time, the processing device 140 may acquire the second display reference position IP1_c on the display plane according to the connection line between the two spatial coordinates. The processing device 140 determines whether a distance Δd1 between the first display reference position IP1_p and the second display reference position IP1_c is greater than a predetermined threshold.

If the distance Δd1 is not greater than the predetermined threshold, referring to FIG. 6A, the processing device 140 may not update the actual display position of the virtual information Vf1 on the display 110 corresponding to the current time, so that the virtual information Vf1 is remained to be displayed at the position of M pixels directly above the first display reference position IP1_p. Conversely, if the distance Δd1 is greater than the predetermined threshold, referring to FIG. 6B, the processing device 140 updates the actual display position of the virtual information Vf1 on the display 110 corresponding to the current time according to the second display reference position IP1_c corresponding to the current time, such as the processing device 140 may set the actual display position corresponding to the current time as a position of M pixels above the second display reference position IP1_c.

Figure 7:
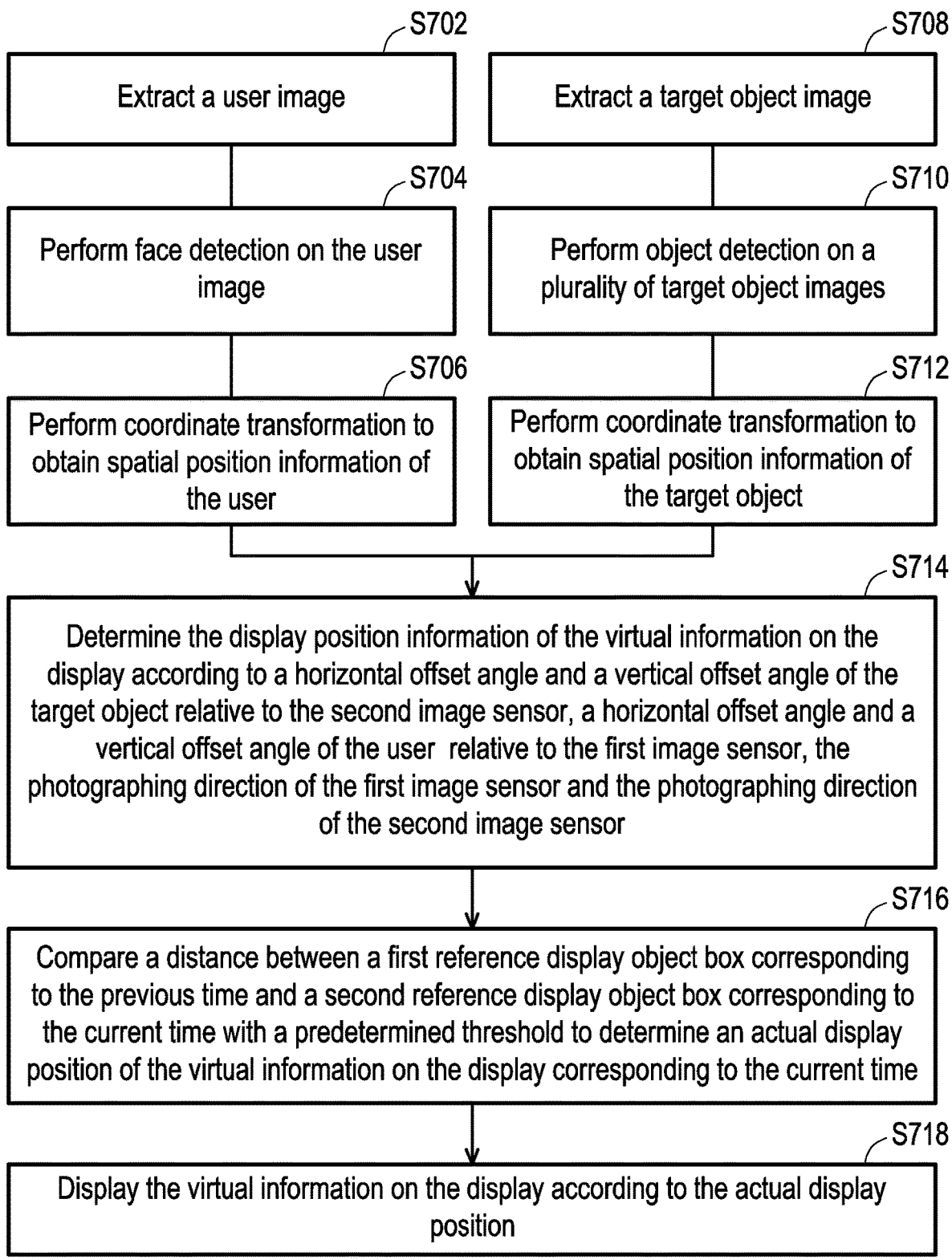
FIG. 7 is a flowchart of an information display method according to an exemplary embodiment of the disclosure.

FIG. 7 is a flowchart of an information display method according to an exemplary embodiment of the disclosure. Referring to FIG. 7, in step S702, the first information extraction device 120 extracts a user image, where the number of users may be more than one. In step S704, the first information extraction device 120 performs face detection on the plurality of user images to obtain a face position in each user image. About step S702 and step S704 may be deduced by referring to the similar related descriptions of step S402 and step S404 in FIG. 4, which will not be repeated here.

In step S706, the first information extraction device 120 performs coordinate transformation according to the face position to obtain the spatial position information of the user U1. The first information extraction device 120 may convert the face position into pixel coordinates corresponding to a predetermined image resolution. In the embodiment of FIG. 7, the spatial position information of the user U1 may include a horizontal offset angle and a vertical offset angle of the user U1 relative to the first image sensor. According to two-dimensional pixel coordinates of the face position and a horizontal field of view (FOV) of the first image sensor, the first information extraction device 120 may calculate the horizontal offset angle of the user U1 relative to the lens optical axis. According to the two-dimensional pixel coordinates of the face position and a vertical FOV of the first image sensor, the first information extraction device 120 may calculate the vertical offset angle of the user U1 relative to the lens optical axis.

In step S708, the second information extraction device 130 extracts a target object image. In step S710, the second information extraction device 130 performs object detection on the plurality of target object images to obtain an object boundary box of the target object in each target object image. About step S708 and step S710 may be deduced by referring to the similar related descriptions of step S410 and step S412 in FIG. 4, which will not be repeated here.

In step S712, the second information extraction device 130 performs coordinate transformation according to the object boundary box to obtain the spatial position information of the target object Obj1. The second information extraction device 130 may convert the object boundary box into pixel coordinates corresponding to the predetermined image resolution. In the embodiment of FIG. 7, the spatial position information of the target object Obj1 may include a horizontal offset angle and a vertical offset angle of the target object Obj1 relative to the first image sensor. According to pixel coordinates of vertical box boundaries of the object boundary box in the target object image and the horizontal FOV of the first image sensor, the first information extraction device 120 may calculate the horizontal offset angle of the target object Obj1 relative to the lens optical axis, i.e., the horizontal offset angle of the left and right box boundaries of the object boundary box with respect to the lens optical axis. According to pixel coordinates of horizontal box boundaries of the object boundary box in the target object image and the vertical FOV of the first image sensor, the first information extraction device 120 may calculate the vertical offset angle of the target object Obj1 relative to the lens optical axis, i.e., the vertical offset angle of the upper and lower box boundaries of the object boundary box with respect to the lens optical axis.

In step S714, the processing device 140 determines the display position information of the virtual information Vf1 on the display 110 according to the horizontal offset angle and the vertical offset angle of the target object Obj1 relative to the second image sensor, the horizontal offset angle and vertical offset angle of the user U1 relative to the first image sensor, the photographing direction of the first image sensor and the photographing direction of the second image sensor.

Figure 8A:
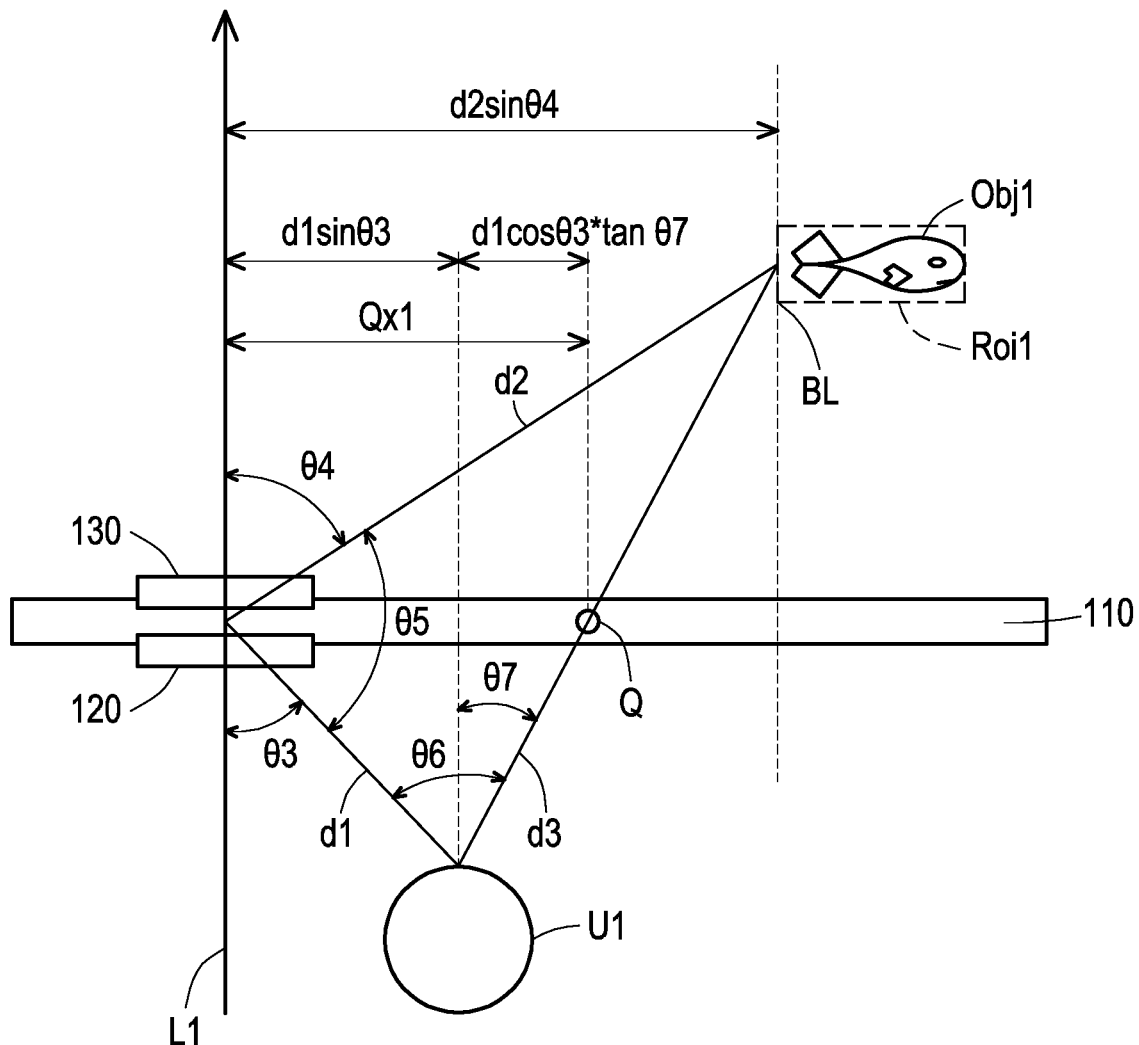
FIG. 8A and FIG. 8B are schematic diagrams of determining display position information according to an exemplary embodiment of the disclosure.
Figure 8B:
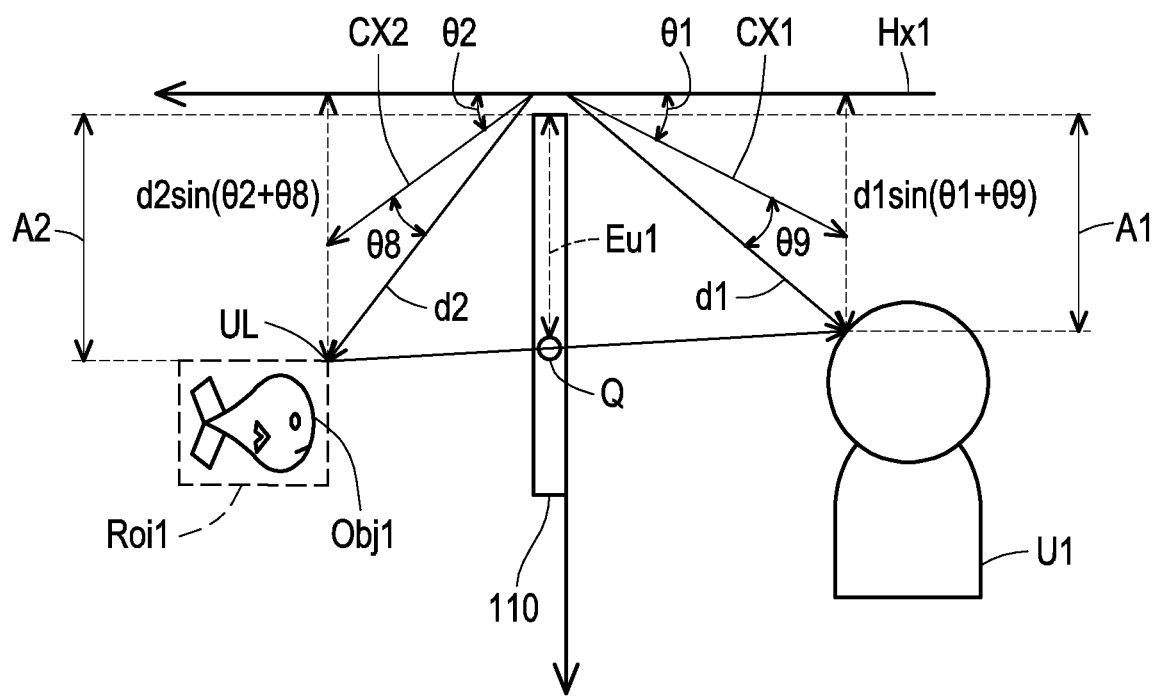

FIG. 8A and FIG. 8B are schematic diagrams of determining display position information according to an exemplary embodiment of the disclosure. In an embodiment, relative positional relationship between the first image sensor, the second image sensor and the display 110 may be defined in advance. For example, if a center point of an upper edge of the display 110 is taken as an origin and the display plane is an XY plane, a position of a lens of the first image sensor and a position of a lens of the second image sensor may be defined based on actual installation positions.

Referring first to FIG. 8A, a left boundary BL of an object boundary box Roi1 of the target object Obj1 is first taken as an example for description. The first information extraction device 120 may provide a horizontal offset angle θ3 of the user U1 relative to the first image sensor and depth information d1 of the user U1 from the first image sensor to the processing device 140. The second information extraction device 130 may provide a horizontal offset angle θ4 of the target object Obj1 relative to the second image sensor and depth information d2 of the target object Obj1 from the second image sensor to the processing device 140.

Therefore, the processing device 140 may obtain an angle θ5 (θ5=180−θ3−θ4), and calculate a distance d3 between the user U1 and the left boundary BL according to the depth information d1 and the depth information d2 based on a cosine theorem. Then, the processing device 140 may calculate an angle θ6 according to the angle θ5, the depth information d1, the depth information d2 and the distance d3 based on a sine theorem, and calculate an angle θ7 according to the angle θ6 and the horizontal offset angle θ3. Therefore, the processing device 140 may calculate a lateral offset distance between the user U1 and a center line L1 of the display 110 as d1*sin θ3, and calculate a lateral offset distance between the left boundary BL and the center line L1 of the display 110 as d2*sin θ4. In addition, the processing device 140 may also calculate that a lateral offset distance Qx1 of an intersection Q of the left boundary BL on the display plane is equal to d1*sin θ3+d1*cos θ3*tan θ7. Similarly, a lateral offset distance of the intersection Q of a right boundary of the object boundary box Roi1 may also be calculated in a similar manner.

Then, referring to FIG. 8B first, an upper boundary UL of the object boundary box Roi1 of the target object Obj1 is first as an example for description. The first information extraction device 120 may provide the photographing pitch angle θ1 of the first image sensor and a vertical offset angle θ9 of the user U1 relative to the first image sensor to the processing device 140. The second information extraction device 130 may provide the photographing pitch angle θ2 of the second image sensor and a vertical offset angle θ8 of the target object Obj1 relative to the second image sensor to the processing device 140.

Therefore, according to the depth information d2, the photographing pitch angle θ2 and the vertical offset angle θ8, the processing device 140 may calculate a distance between the upper boundary UL and the upper edge of the display 110 as d2 sin(θ2+θ8). According to the depth information d1, the photographing pitch angle θ1 and the vertical offset angle θ9, the processing device 140 may calculate a distance between the user U1 and the upper edge of the display 110 as d1 sin(θ1+θ9). In an embodiment, the processing device 140 may further correct the above calculation result according to the distances between the lenses of the two image sensors and the upper edge of the display 110 to obtain actual distances between the user U1, the target object Obj1 and the upper edge of the display 110. Thereafter, the processing device 140 may calculate a vertical offset distance Eu1 of the intersection Q of the upper boundary UL on the display plane based on the following formula (4).

$$Eu1 = \frac{A1 \times d2 \times \sin(\theta 2 + \theta 8) + A2 \times d1 \times \sin(\theta 1 + \theta 9)}{d1 \times \sin(\theta 1 + \theta 9) + d2 \times \sin(\theta 2 + \theta 8)} \quad \text{equation (4)}$$

Where, an actual distance A1 between the user U1 and the upper edge of the display 110 may be expressed as d1×sin(θ1+θ9)−Δdc11, where Δdc11 is a distance between the lens of the first image sensor and the upper edge of the display 110 the distance. An actual distance A2 between the target object Obj and the upper edge of the display 110 may be expressed as d2×sin(θ2+θ8)−Δdc12, where Δdc12 is a distance between the lens of the second image sensor and the upper edge of the display 110 the distance. Similarly, a vertical offset distance of an intersection of a lower boundary of the object bounding box Roi1 may also be calculated in a similar way.

Based on the above description, the processing device 140 may obtain a reference display object box corresponding to the object boundary box Roi1 on the display plane. Based on the calculation method shown in FIG. 8A, the processing device 140 may obtain lateral offset distances between left and right boundaries of the reference display object box on the display plane and the center line L1 of the display 110 respectively. Based on the calculation method shown in FIG. 8B, the processing device 140 may obtain vertical offset distances between upper and lower boundaries of the reference display object box on the display plane and the upper edge of the display 110 respectively. In other words, the reference display object box corresponding to the object boundary box Roi1 on the display plane may be represented by two linear equations parallel to the display X axis and two linear equations parallel to the display Y axis. Where, four box vertices of the reference display object box may be obtained from intersection points of these linear equations.

Thereafter, the processing device 140 may obtain display position information according to the size and resolution of the display 110, and the display position information may be pixel coordinates of the display 110. The processing device 140 may convert the reference display object box into pixel coordinates on the display 110 according to the size and resolution of the display 110 to obtain the display position information of the virtual information Vf1 on the display 110. Namely, the reference display object box on the display plane is represented by a pixel coordinate system.

Referring back to FIG. 7, in step S716, the processing device 140 compares a distance between a first reference display object box corresponding to the previous time and a second reference display object box corresponding to the current time with a predetermined threshold to determine an actual display position of the virtual information Vf1 on the display 110 corresponding to the current time. In step S718, the processing device 140 displays the virtual information Vf1 on the display 110 according to the actual display position.

Figure 9A:
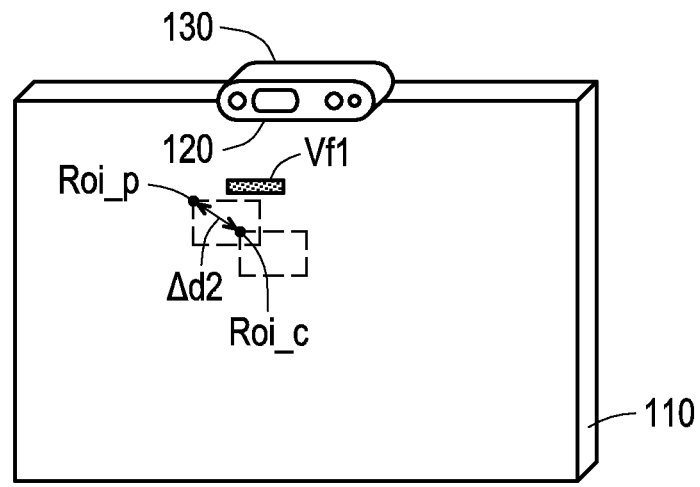
FIG. 9A is a schematic diagram of not updating the actual display position according to an exemplary embodiment of the disclosure.
Figure 9B:
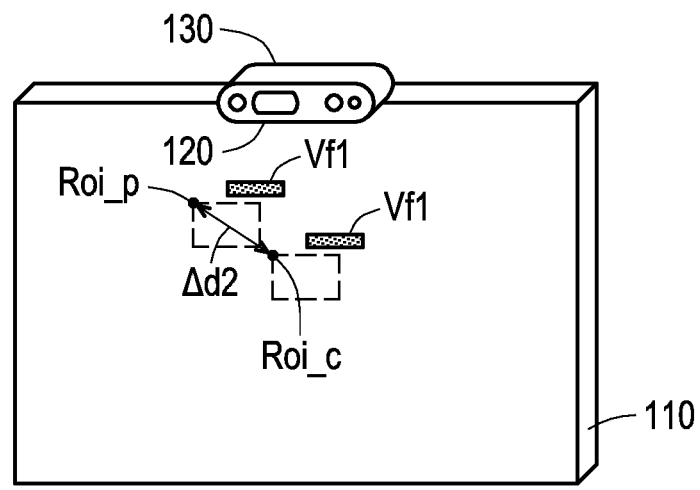
FIG. 9B is a schematic diagram of updating the actual display position according to an exemplary embodiment of the disclosure.

FIG. 9A is a schematic diagram of not updating the actual display position according to an exemplary embodiment of the disclosure. FIG. 9B is a schematic diagram of updating the actual display position according to an exemplary embodiment of the disclosure. Referring to FIG. 9A and FIG. 9B, in the embodiment, the display position information includes the reference display object box corresponding to the object boundary box in the target image. The reference display object box may include a first reference display object box Roi_p corresponding to the previous time and a second reference display object box Roi_c corresponding to the current time. The first display reference position includes the first reference display object box Roi_p, and the second display reference position includes the second reference display object box Roi_c.

The first reference display object box Roi_p corresponding to the previous time and the second reference display object box Roi_c corresponding to the current time may be determined according to the calculation methods of the embodiments shown in FIG. 7, FIG. 8A and FIG. 8B. Based on the previous user image and the previous target object image corresponding to the previous time, the processing device 140 may acquire the first reference display object box Roi_p on the display plane. Then, for example, it is assumed that pixel coordinates of an upper left vertex of the first reference display object box Roi_p are (x1, y1), the processing device 140 may set the actual display position corresponding to the previous time to pixel coordinates of (x1+αw1, y1+βh1). Where, w1 is a width of the first reference display object box Roi_p, and h1 is a height of the first reference display object box Roi_p, and α and β may be set according to actual conditions, which are not limited by the disclosure.

Then, based on the current user image and the current target object image corresponding to the current time, the processing device 140 may acquire the second reference display object box Roi_c on the display plane. The processing device 140 compares a distance Δd2 between the first reference display object box Roi_p corresponding to the previous time and the second reference display object box Roi_c corresponding to the current time with a predetermined threshold.

The processing device 140 calculates a distance between a first reference point of the first reference display object bpx Roi_p and a second reference point of the second reference display object box Roi_c. The first reference point and the second reference point may be respectively, a box center point or a box vertex. In the example of FIGS. 9A and 9B, the first reference point and the second reference point are respectively an upper left vertex of the first reference display object box Roi_p and an upper left vertex of the second reference display object box Roi_c.

In an embodiment, the predetermined threshold may be determined according to a size of the second reference display object box Roi_c. For example, the predetermined threshold may be equal to $\min(\gamma^*w2, \gamma^*h2)$. Where, w2 is a width of the second reference display object box Roi_c, and h2 is a height of the second reference display object box Roi_c. γ may be a value between 0 and 1, which may be set according to actual conditions, and is not limited by the disclosure. $\min(\cdot)$ represents a function of obtaining the minimum value. Therefore, the predetermined threshold may be flexibly set in response to the size of the reference object box. The predetermined threshold may be proportional to the size of the reference object box.

If the distance Δd2 is not greater than the predetermined threshold, referring to FIG. 9A, the processing device 140 does not update the actual display position of the virtual information Vf1 on the display 110 corresponding to the current time, and the virtual information Vf1 may be maintained to be displayed above the first reference display object box Roi_p. Conversely, if the distance Δd2 is greater than the predetermined threshold, referring to FIG. 9B, the processing device 140 updates the actual display position of the virtual information Vf1 on the display 110 corresponding to the current time according to the second reference display object box Roi_c corresponding to the current time. For example, it is assumed that pixel coordinates of an upper left vertex of the second reference display object box Roi_c are (x2, y2), the processing device 140 may set the actual display position corresponding to the current time to pixel coordinates of (x2+αw2, y2+βh2). Where, w2 is a width of the second reference display object box Roi_c, and h2 is a height of the second reference display object box Roi_c. α and β may be set according to actual conditions, which are not limited by the disclosure.

In an embodiment, in response to the display position information being located at a display edge region of the display 110, the processing device 140 adjusts the display position information in a direction away from an edge of the display 110. After the processing device 140 obtains the display position information at a certain time point, if the display position information is located in the display edge region of the display 110, it means that the virtual information may be displayed in the display edge region of the display 110 or even incompletely displayed, causing viewing difficulty of the user U1. Therefore, the processing device 140 further adjusts the display position information, for example, the processing device 140 may adjust the display position information in a direction away from the edge of the display 110.

For example, when the intersection position calculated based on the calculation method of FIG. 5B is located in the display edge region of the display 110, the processing device 140 may adjust the intersection position in a direction away from the edge of the display 110, and then determine the actual display position according to the adjusted intersection position. Alternatively, when the reference display object box calculated based on the calculation methods of FIG. 8A and FIG. 8B is located in the display edge region of the display 110, the processing device 140 may adjust the reference display object box in a direction away from the edge of the display 110, and then determine the actual display position according to the adjusted reference display object box.

In an embodiment, the processing device 140 may adjust a coordinate component of the display position information on the vertical axis according to a following equation (5).

$$Y=P_y-F*0.1*(P_y-c) \qquad \text{equation (5)}$$

Where, $P_y$ is an original Y coordinate of the display position information, F is an adjustment weight, and c is a constant. F is, for example, a value between 1 and 100, which may be set according to actual conditions, and is not limited by the disclosure. The constant c may be determined according to a display region of the original Y coordinate. For example, it is assumed that the original Y coordinate of the display position information is located in a central region of a display range, the constant c may be set to be equal to the original Y coordinate, i.e., the original Y coordinate is not adjusted. It is assumed that the original Y coordinate of the display position information is located in an edge region of the display range, the constant c may be set to be not equal to the original Y coordinate, i.e., the original Y coordinate is adjusted in a direction away from the edge of the display 110. Similarly, the coordinate component of the display position information on the horizontal axis may also be adjusted in a similar manner.

In some embodiments, the processing device 140 may further determine the display position information of the virtual information on the display 110 according to posture information of the user. The first information extraction device 120 may be used to extract the posture information of the user. The first information extraction device 120 may recognize postures presented by user's limbs, torso and/or head through various human posture recognition technologies. For example, the first information extraction device 120 may identify a human body skeleton or human body feature points, etc., according to image data, so as to recognize a posture of the user. In some embodiments, the first information extraction device 120 may perform face detection on the user images to obtain a face position and face feature points in each user image. The disclosure does not limit the number of the face feature points, which may include, for example, mouth corner feature points, eyebrow center feature points, or eye corner feature points, etc. In some embodiments, the first information extraction device 120 or the processing device 140 may identify a face center displacement amount and a head rotation angle of the user according to the face feature points in multiple user images. The posture information of the user includes the face center displacement amount and the head rotation angle.

In some embodiments, the processing device 140 may determine head movement or rotation of the user according to the posture information of the user. In response to determining the head movement of the user according to the posture information of the user, the processing device 140 may determine the display position information of the virtual information of the target object on the display 110 according to the spatial position information of the user and the spatial position information of the target object. Namely, when the processing device 140 determines that the user's head moves, the processing device 140 may determine the actual display position of the virtual information according to the process shown in FIG. 2, FIG. 4 or FIG. 7. On the other hand, in response to determining the head rotation of the user according to the posture information of the user, the processing device 140 may determine the display position information of the virtual information of the target object on the display 110 according to the spatial position information and the posture information of the user and the spatial position information of the target object. When the processing device 140 determines that the user's head is rotated, the processing device 140 may update the display position information of the virtual information of the target object on the display 110 according to a head rotation angle of the user. For example, when the user's head does not move, the processing device 140 may use the head rotation angle of the user to update the display position information determined at a previous time point.

In some embodiments, the processing device 140 may estimate a head behavior index according to the face center displacement amount in the posture information. The above head behavior index may be the face center displacement amount divided by a head radius reference value. For example, the head radius reference value may be 80 mm. By comparing the head behavior index and a variation amount of the head rotation angle, the processing device 140 may determine the head movement or rotation of the user, so as to determine the display position information of the virtual information on the display 110 in response to the head movement or rotation of the user.

In some embodiments, if the head behavior index is less than or equal to the variation amount of the head rotation angle, the processing device 140 determines the head movement of the user, i.e., the user's head moves from a first spatial position to a second spatial position. Therefore, the flow shown in FIG. 2, FIG. 4 or FIG. 7 may be executed to determine the actual display position of the virtual information. If the head behavior index is greater than the variation amount of the head rotation angle, the processing device 140 determines the head rotation of the user, i.e., the head rotation of the user changes. Therefore, the processing device 140 may determine the display position information of the virtual information of the target object on the display 110 according to the spatial position information and the head rotation angle of the user, and the spatial position information of the target object. For example, the processing device 140 may use the head rotation angle of the user to update the display position information determined at the previous time point, and determine the actual display position of the virtual information accordingly. Alternatively, the processing device 140 may identify another target object by using the head rotation angle of the user and the spatial position information of the user, so as to determine display position information of another virtual information of another target object on the display 110 according to the spatial position information of the other target object and the spatial position information of the user.

The information display method, the processing device and the information display system proposed by the exemplary embodiments of the disclosure may calculate the display position information where the line of sight is projected on the display plane according to the user position and the target object position in real time, and accordingly generate the actual display position of the virtual information. Thereby, even if the movement of the target object is variable or unpredictable, the virtual information displayed according to the actual display position may follow the movement of the target object in real time. In addition, the exemplary embodiments of the disclosure may determine whether to update the actual display position of the virtual information on the display corresponding to the current time according to the distance between the first display reference position of the previous time and the second display reference position of the current time. In this way, the virtual information displayed based on real-time object recognition may be displayed stably and smoothly, which greatly improves a viewing experience of the user.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An information display system, comprising:
a light transmissive display;
a first information extraction device, configured to extract spatial position information of a user;
a second information extraction device, configured to extract spatial position information of a target object, wherein the second information extraction device comprises a second image sensor for photographing the target object;
a processing device, connected to the display, the first information extraction device, and the second information extraction device, and configured to:
determine display position information of virtual information of the target object on the display according to the spatial position information of the user and the spatial position information of the target object, wherein the display position information comprises a first display reference position corresponding to a previous time and a second display reference position corresponding to a current time;
determine an actual display position of the virtual information on the display corresponding to the current time according to a distance between the first display reference position and the second display reference position; and
display the virtual information on the display according to the actual display position,
wherein the second information extraction device performs object detection on a plurality of target object images to obtain an object boundary box of the target object in each of the target object images, and the display position information comprises a reference display object box corresponding to each of the object boundary boxes on a display plane of the display,
wherein the reference display object box comprises a first reference display object box corresponding to the previous time and a second reference display object box corresponding to the current time, the first display reference position comprises the first reference display object box, and the second display reference position comprises the second reference display object box.

2. The information display system as claimed in claim 1, wherein the processing device is configured to:
  in response to the distance between the first display reference position and the second display reference position being greater than a predetermined threshold, update the actual display position of the virtual information on the display corresponding to the current time according to the second display reference position corresponding to the current time; and
  in response to the distance between the first display reference position and the second display reference position being not greater than the predetermined threshold, do not update the actual display position of the virtual information on the display corresponding to the current time.

3. The information display system as claimed in claim 1, wherein the first information extraction device is configured to extract posture information of the user, and the processing device is further configured to:
  determine head movement or head rotation of the user according to the posture information of the user; and
  in response to determining the head movement of the user according to the posture information of the user, determine the display position information of the virtual information of the target object on the display according to the spatial position information of the user and the spatial position information of the target object, or in response to determining the head rotation of the user according to the posture information of the user, determine the display position information of the virtual information of the target object on the display according to the spatial position information and the posture information of the user and the spatial position information of the target object.

4. The information display system as claimed in claim 1, wherein the first information extraction device comprises a first image sensor for photographing the user.

5. The information display system as claimed in claim 4, wherein the second information extraction device performs coordinate transformation according to the object boundary box to obtain the spatial position information of the target object,
  wherein the first information extraction device performs face detection on a plurality of user images to obtain a face position in each of the user images, and the first information extraction device performs coordinate transformation according to the face position to obtain the spatial position information of the user.

6. The information display system as claimed in claim 4, wherein the spatial position information of the target object comprises target object camera coordinates under a camera coordinate system, and the spatial position information of the user comprises user camera coordinates under the camera coordinate system,
  the processing device converts the user camera coordinates into user position coordinates relative to the display according to a photographing direction of the first image sensor, and converts the target object camera coordinates into target object position coordinates relative to the display according to a photographing direction of the second image sensor,
  wherein the processing device determines the display position information of the virtual information on the display according to a connection line between the target object position coordinates and the user position coordinates.

7. The information display system as claimed in claim 6, wherein the display position information comprises an intersection position where the connection line intersects a display plane of the display.

8. The information display system as claimed in claim 4, wherein the spatial position information of the target object comprises a horizontal offset angle and a vertical offset angle of the target object relative to the second image sensor, and the spatial position information of the user comprises a horizontal offset angle and a vertical offset angle of the user relative to the first image sensor,
  wherein the processing device determines the display position information of the virtual information on the display according to the horizontal offset angle and the vertical offset angle of the target object relative to the second image sensor, the horizontal offset angle and the vertical offset angle of the user relative to the first image sensor, and a photographing direction of the first image sensor and a photographing direction of the second image sensor.

9. The information display system as claimed in claim 8, wherein the processing device compares a distance between the first reference display object box corresponding to the previous time and the second reference display object box corresponding to the current time with a predetermined threshold to determine the actual display position of the virtual information on the display corresponding to the current time.

10. The information display system as claimed in claim 9, wherein the predetermined threshold is determined according to a size of the second reference display object box.

11. The information display system as claimed in claim 9, wherein the processing device calculates the distance between a first reference point of the first reference display object box and a second reference point of the second reference display object box, and the first reference point and the second reference point are box center points or box vertices.

12. The information display system as claimed in claim 1, wherein in response to the display position information being located in a display edge region of the display, the processing device adjusts the display position information in a direction away from an edge of the display.

13. The information display system as claimed in claim 1, wherein the actual display position and the display position information are pixel coordinates of the display, and the processing device obtains the display position information according to a size and resolution of the display.

14. An information display method, adapted for an information display system comprising a light transmissive display, a first information extraction device, a second information extraction device and a processing device, and the information display method comprising:
  using the first information extraction device to extract spatial position information of a user;
  using the second information extraction device to extract spatial position information of a target object, wherein the second information extraction device comprises a second image sensor for photographing the target object;
  determining display position information of virtual information of the target object on the display according to the spatial position information of the user and the spatial position information of the target object, wherein the display position information comprises a first display reference position corresponding to a previous time and a second display position corresponding to a current time;

determining an actual display position of the virtual information on the display corresponding to the current time according to a distance between the first display reference position and the second display reference position; and displaying the virtual information on the display according to the actual display position, wherein the second information extraction device performs object detection on a plurality of target object images to obtain an object boundary box of each of the target objects in the target object images, and the display position information comprises a reference display object box corresponding to each of the object boundary boxes on a display plane of the display, wherein the reference display object box comprises a first reference display object box corresponding to the previous time and a second reference display object box corresponding to the current time, the first display reference position comprises the first reference display object box, and the second display reference position comprises the second reference display object box.

15. The information display method as claimed in claim 14, wherein the step of determining the actual display position of the virtual information on the display corresponding to the current time according to the distance between the first display reference position and the second display reference position comprises:

in response to the distance between the first display reference position and the second display reference position being greater than a predetermined threshold, determining the actual display position of the virtual information on the display corresponding to the current time according to the second display reference position corresponding to the current time; and in response to the distance between the first display reference position and the second display reference position being not greater than the predetermined threshold, determining the actual display position of the virtual information on the display corresponding to the current time according to the first display reference position corresponding to the previous time.

16. The information display method as claimed in claim 14, further comprising:

using the first information extraction device to extract posture information of a user, wherein the step of determining the display position information of the virtual information of the target object on the display according to the spatial position information of the user and the spatial position information of the target object comprises:

determining head movement or head rotation of the user according to the posture information of the user; and in response to determining the head movement of the user according to the posture information of the user, determining the display position information of the virtual information of the target object on the display according to the spatial position information of the user and the spatial position information of the target object, or in response to determining the head rotation of the user according to the posture information of the user, determining the display position information of the virtual information of the target object on the display according to the spatial position information and the posture information of the user and the spatial position information of the target object.

17. The information display method as claimed in claim 14, wherein the first information extraction device comprises a first image sensor for photographing the user, wherein the step of using the second information extraction device to extract the spatial position information of the target object comprises:

using the second information extraction device to perform coordinate transformation according to the object boundary box to obtain the spatial position information of the target object, wherein the step of using the first information extraction device to extract the spatial position information of the user comprises:

using the first information extraction device to perform face detection on a plurality of user images to obtain a face position in each of the user images, and perform coordinate transformation according to the face position to obtain the spatial position information of the user.

18. The information display method as claimed in claim 17, wherein the step of determining the actual display position of the virtual information on the display at the current time according to the distance between the first display reference position and the second display reference position comprises:

comparing a distance between the first reference display object box corresponding to the previous time and the second reference display object box corresponding to the current time with a predetermined threshold to determine the actual display position of the virtual information on the display corresponding to the current time.

19. The information display method as claimed in claim 14, wherein in response to the display position information being located in a display edge region of the display, the processing device adjusts the display position information in a direction away from an edge of the display.

20. A processing device, connected to a light transmissive display, a first information extraction device, and a second information extraction device, wherein the first information extraction device is configured to extract spatial position information of a user, the second information extraction device is configured to extract spatial position information of a target object, the second information extraction device comprises a second image sensor for photographing the target object, and the processing device comprises:

a memory, configured to store data; and a processor, connected to the memory, and configured to:

obtain the spatial position information of the user from the first information extraction device;

obtain the spatial position information of the target object from the second information extraction device;

determine display position information of virtual information of the target object on the display according to the spatial position information of the user and the spatial position information of the target object, wherein the display position information comprises a first display reference position corresponding to a previous time and a second display reference position corresponding to a current time;

determine an actual display position of the virtual information on the display corresponding to the current time according to a distance between the first display reference position and the second display reference position; and display the virtual information on the display according to the actual display position, wherein the second information extraction device performs object detection on a plurality of target object images to obtain an object boundary box of the target object in each of the target object images, and the display position information comprises a reference display object box corresponding to each of the object boundary boxes on a display plane of the display, wherein the reference display object box comprises a first reference display object box corresponding to the previous time and a second reference display object box corresponding to the current time, the first display reference position comprises the first reference display object box, and the second display reference position comprises the second reference display object box.

* * * * *